(12) United States Patent
Uenishi

(10) Patent No.: US 8,739,822 B2
(45) Date of Patent: Jun. 3, 2014

(54) OIL TANK

(75) Inventor: Yukio Uenishi, Osaka (JP)

(73) Assignee: U-Tec Co., Ltd., Osaka (JP)

( * ) Notice: Subject to any disclaimer, the term of this patent is extended or adjusted under 35 U.S.C. 154(b) by 0 days.

(21) Appl. No.: 13/576,948

(22) PCT Filed: Feb. 1, 2011

(86) PCT No.: PCT/JP2011/052042
§ 371 (c)(1),
(2), (4) Date: Aug. 3, 2012

(87) PCT Pub. No.: WO2011/096397
PCT Pub. Date: Aug. 11, 2011

(65) Prior Publication Data
US 2012/0305114 A1  Dec. 6, 2012

(30) Foreign Application Priority Data

Feb. 3, 2010 (JP) .................................. 2010-021879
Jan. 27, 2011 (JP) .................................. 2011-015034

(51) Int. Cl.
*B01D 19/00* (2006.01)
*F01M 11/02* (2006.01)

(52) U.S. Cl.
USPC ........... 137/574; 137/571; 137/171; 210/188; 96/220

(58) Field of Classification Search
CPC ............. F15B 21/044; B01D 19/0042; F01M 11/0004; B60K 2015/03118
USPC .......... 137/571, 171, 574; 210/188; 184/6.23; 55/488; 96/206, 207, 220
See application file for complete search history.

(56) References Cited

U.S. PATENT DOCUMENTS

| 4,210,176 A * | 7/1980 | Emming ........................ 137/573 |
| 6,116,454 A * | 9/2000 | Henderson et al. ........... 220/563 |
| 2003/0233942 A1 | 12/2003 | Konishi et al. |
| 2008/0121289 A1 * | 5/2008 | Kobayashi et al. ........... 137/547 |

FOREIGN PATENT DOCUMENTS

| JP | 50-42049 U | 4/1975 |
| JP | 61-114102 U | 7/1986 |
| JP | 61-194805 U | 12/1986 |
| JP | 63-7514 U | 1/1988 |

(Continued)

OTHER PUBLICATIONS

International Preliminary Report on Patentability (PCT/IPEA/409) from PCT/JP2011/052042 dated Oct. 11, 2012 (6 pages).

(Continued)

*Primary Examiner* — Craig Schneider
*Assistant Examiner* — Atif Chaudry
(74) *Attorney, Agent, or Firm* — Osha Liang LLP

(57) ABSTRACT

An oil tank has return oil from a hydraulic circuit diffused onto a surface of oil stored in a tank body, and thereby the return oil is prevented from going deep in the oil, so that a hydraulic pump is prevented from sucking oil containing air bubbles. The oil tank includes: an intake port provided in the vicinity of a bottom of the tank body and connected to the hydraulic pump of a hydraulic circuit; and an return oil inlet connected to a return pipe of the hydraulic circuit through which the return oil enters the tank body. In the tank body, a container adapted to hold the return oil is provided. The container is configured so that the return oil inlet opens in the vicinity of the bottom of the container.

5 Claims, 14 Drawing Sheets

(56) References Cited

FOREIGN PATENT DOCUMENTS

| | | | |
|---|---|---|---|
| JP | 3-278804 | A | 12/1991 |
| JP | 4-70111 | U | 6/1992 |
| JP | 7-308512 | A | 11/1995 |
| JP | 2000-24407 | A | 1/2000 |
| JP | 2004-84923 | A | 3/2004 |

OTHER PUBLICATIONS

International Search Report w/translation from PCT/JP2011/052042 dated Mar. 1, 2011 (7 pages).
International Preliminary Report on Patentability (PCT/IPEA/409) from PCT/JP2011/052042 dated Feb. 20, 2012 (18 pages).
Espacenet Abstract JP61114102U dated Jul. 18, 1986 (1 page).
Espacenet Abstract JP61194805U dated Dec. 4, 1986 (1 page).
Espacenet Abstract JP7308512A dated Nov. 28, 1995 (1 page).
Espacenet Abstract JP3278804A dated Dec. 10, 1991 (2 pages).
Espacenet Abstract JP63007514U dated Jan. 19, 1988 (1 page).
Espacenet Abstract JP50042049U dated Apr. 28, 1975 (1 page).
Espacenet Abstract JP2000024407A dated Jan. 25, 2000 (1 page).

* cited by examiner

OIL TANK

CROSS-REFERENCE TO RELATED APPLICATIONS

This application is a national stage application of PCT/JP2011/052042, filed on Feb. 1, 2011, entitled "OIL TANK," which claims priority to Japanese Patent Application No. 2010-021879, filed on Feb. 3, 2010, and Japanese Patent Application No. 2011-015034, filed on Jan. 27, 2011. Each of these applications are incorporated herein by reference in their entireties.

TECHNICAL FIELD

The present invention relates to an oil tank which is attached to a hydraulic circuit including a hydraulic pump supplying hydraulic pressure oil to hydraulic equipment such as a hydraulic cylinder, hydraulic motor, or the like, the oil tank being connected to the hydraulic pump.

BACKGROUND ART

A hydraulic system used in production facilities of a plant, a construction machine, or used for powering various types of floodgate facilities (such as an estuary barrage, a floodgate constructed in a river, or a drainage gate of a dam) is constituted of: a hydraulic circuit and an oil tank. The hydraulic circuit includes: an actuator (a hydraulic cylinder, hydraulic motor, or the like) which actuates equipment in the above-described production facilities or the construction machine, or equipment in the facilities such as the floodgate, barrage and the like; a control valve which controls supply/discharge of hydraulic pressure oil to/from the actuator; and a hydraulic pump which produces the hydraulic pressure oil. The oil tank stores: oil to be sucked by the hydraulic pump which supplies hydraulic pressure oil to the hydraulic circuit; and return oil, that is oil which has been returned from the hydraulic circuit.

In the hydraulic circuit, flushing, in which hydraulic oil from the hydraulic pump is circulated so that the hydraulic circuit is filled with the hydraulic pressure oil, is conducted after the construction of the hydraulic system is completed (hereinafter, this flushing is referred to as "initial flushing"). By this initial flushing, return oil which contains, in the form of air bubbles, air having existed in the hydraulic circuit is returned to the oil tank. If the return oil containing the air bubbles is returned to the oil tank and mixed into stock oil, that is oil which has been held in the oil tank, and the thus mixed stock oil is sucked by the hydraulic pump and then is supplied to the hydraulic equipment as hydraulic pressure oil, the air bubbles in the stock oil may cause cavitation in the hydraulic motor, or may be pressurized in the hydraulic equipment to cause a diesel explosion, resulting in a failure of the hydraulic pump or the hydraulic equipment.

Therefore, once the return oil returned at the time of the initial flushing is mixed with the stock oil held in the tank body, the thus mixed oil has to be kept standing until the air bubbles disappear from the stock oil held in the tank body. However, since the air bubbles contained in the return oil is very small and the oil has high viscosity, it takes a long time for the air bubbles to come up to a surface of the oil to be dispersed into air, so there is a problem that the hydraulic system cannot be operated during this time.

One possible way to be taken to avoid this problem is as follows: using an oil tank exclusively used for flushing, hydraulic oil is circulated until air is removed from the hydraulic circuit and the hydraulic oil containing air bubbles is discarded, and then this oil tank is exchanged to another tank which stores new hydraulic oil. However, in the case where the hydraulic circuit is large and long, such as that in a hydraulic system for operating a floodgate (its piping corresponds to the width of a river), there is a problem that the cost for the hydraulic oil is expensive.

Further, even if air bubbles in the oil tank are completely removed through the initial flushing, as the equipment operates, air enters and contamination occurs. The contamination is, for example, contamination resulting from a work environment or entry of external air, and this contamination may cause a failure of working equipment. Therefore, in the hydraulic circuit, it is necessary to occasionally conduct flushing for cleaning the hydraulic oil in the circuit (hereinafter, this flushing is referred to as "cleaning flushing"). Similarly to the above, if air bubbles contained in return oil at the time of cleaning flushing is mixed with the stock oil, and the oil containing the air bubbles is sucked by the hydraulic pump and circulated as hydraulic pressure oil, a harmful effect is exerted on the working equipment.

Patent Literature 1, which is a conventional art to solve the above problem, discloses an apparatus including: flow adjustment means for adjusting the flow of return oil containing air bubbles and then discharging the return oil to an oil tank; and a bubble removal plate disposed so as to be slightly inclined above a surface of oil which has been stored, the apparatus being configured so that the return oil entering the oil tank is caused to flow down along an upper surface of the bubble removal plate and thereby the air bubbles contained in the return oil are removed.

Meanwhile, Patent Literature 2 discloses an oil tank configured so that air bubbles contained in oil returned to the oil tank after passing through the hydraulic circuit are removed using a cyclone-type air bubble removal apparatus provided in the oil tank.

CITATION LIST

Patent Literature

Patent Literature 1: Japanese Unexamined Patent Publication No. 2000-24407
Patent Literature 2: Japanese Unexamined Patent Publication No. 2004-84923

SUMMARY OF INVENTION

Technical Problem

In the bubble removal apparatus for return oil disclosed in Patent Literature 1, the bubble removal plate is provided below the flow adjustment means. Functions of the apparatus are as follows: by adjusting the flow of the return oil using the flow adjustment means, the return oil is prevented from spattering when it hits the bubble removal plate, and this prevents involvement of air; and by causing the return oil containing bubbles to flow down along the upper surface of the bubble removal plate widely and gently, the bubbles are separated into the air. However, bubbles contained in highly viscous oil become very small through a process of passing complicated passages of the hydraulic circuit, and bubbles are suspended, in which state separation of the bubbles is difficult. With the bubble removal plate of the bubble removal apparatus for return oil disclosed in Patent Literature 1, air bubbles, which cannot be separated because it is difficult to separate them during a period in which the return oil flows widely and gently on the upper surface of the plate, drops down together with the return oil, from the bubble removal plate to a surface of stock oil held in the tank, and is mixed into the stock oil. The return oil goes deep in the stock oil held in the tank due to the inertia of dropping hydraulic oil, and this causes a problem that the air bubbles go all over the oil tank.

Further, in the apparatus disclosed in Patent Literature 2, the apparatus being configured to remove air bubbles in return oil using a cyclone provided in an oil tank, vortexes are generated in the cyclone by returned hydraulic oil, and with their centrifugal forces, air bubbles are separated from the hydraulic oil. However, since the hydraulic oil has high viscosity, a resistance in a circuit is increased when vortexes are generated in the cyclone, and this causes a problem of a reduction in efficiency of a hydraulic system. Further, since air bubbles removed using the cyclone are discharged into the hydraulic oil, there is a problem that the air bubbles enter the oil tank.

The present invention has been made in view of the above problems. An object of the present invention is to provide an oil tank which reliably prevents a hydraulic pump from sucking oil containing air bubbles by a structure such that: return oil from a hydraulic circuit is put into a container provided in the oil tank thereby to avoid mixing of the return oil with stock oil held in the tank body; and the return oil from the hydraulic circuit stored in the container is diffused from an upper portion of the container onto a surface of the stock oil held in the tank body, and thereby the return oil is prevented from going deep in the stock oil held in the tank body.

Solution to Problem

An oil tank according to a second aspect of the invention includes: an intake port which is provided in the vicinity of a bottom of a tank body adapted to hold oil and which is connected to a hydraulic pump adapted to supply hydraulic pressure oil to a hydraulic circuit; and a return oil inlet which is connected to a return pipe of the hydraulic circuit and through which return oil from the hydraulic circuit is discharged to the tank body, in which oil tank, a container adapted to hold the return oil is provided in the tank body, the container including a bottom formed at the bottom of the tank body; an open end positioned above an upper operational oil level of stock oil held in the tank body; the return oil inlet which opens in the vicinity of the bottom of the container, and a flow adjustment wing is arranged along the open end, the flow adjustment wing being provided so that a flow of stock oil having held in the container and overflowing through the open end is converted, at a position below a lower operational oil level of the stock oil held in the tank body, to a flow along a surface of the stock oil held in the tank body.

With the above structure, the return oil entering the container is stored in the container, and the stock oil, which is caused to overflow through the open end of the container by the return oil entering afterward, flows down along the container, and is caused to float, by the flow adjustment wing, along the surface of the stock oil (surface at the operational oil level) held in the tank body. Therefore, air bubbles having entered together with the return oil held in the container are diffused on the surface of the stock oil held in the tank body and the air bubbles are prevented from going deep in the stock oil, with the result that the air bubbles are not sucked by the hydraulic pump. This brings about an advantageous effect that a failure of the hydraulic equipment is prevented. Further, since the open end of the container is provided above the upper operational oil level of the stock oil held in the tank body, even if the oil level of the stock oil held in the tank body fluctuates with the use of the hydraulic circuit, the stock oil held in the tank body is completely separated from the return oil. Furthermore, the stock oil having overflowed the container through the open end flows down along the container, and is caused to float on the surface of the stock oil held in the tank body, by the flow adjustment wing provided below the lower operational oil level of the stock oil held in the tank body. Thus, since the open end of the container is provided above the upper operational oil level of the stock oil held in the tank body, while the flow adjustment wing is provided below the lower operational oil level of the stock oil held in the tank body, it is possible to cause the return oil to float on the surface of the stock oil held in the tank body even if a large amount of return oil overflows the container, and therefore provided is an advantageous effect that the container is downsized and the real capacity of the tank body is increased.

Further, by providing the open end of the container above the upper operational oil level of the stock oil held in the tank body, the stock oil held in the tank body is completely separated from the return oil, and by using the flow adjustment wing provided below the lower operational oil level of the stock oil held in the tank body, the stock oil in the container is diffused on the surface of the stock oil held in the tank body. Accordingly, it is possible to deal with fluctuation, between the open end and the flow adjustment wing, of the oil level of the stock oil held in the tank body. In other words, as is the case of the hydraulic cylinder, when there is a difference in volume between the rod-side and the head-side of the equipment, the oil level of the stock oil held in the tank body fluctuates corresponding to the variation in volume. As long as the fluctuating level is between the open end of the container and the flow adjustment wing, the return oil floats on the surface of the stock oil, and therefore provided is an advantageous effect that it is possible to deal with large fluctuation of the oil level of the stock oil.

An oil tank according to a third aspect of the invention is the oil tank according to the second aspect, in which oil tank, the flow adjustment wing includes a plurality of flow adjustment wings which are provided so as to be aligned in a direction of a depth of the container, and a lower flow adjustment wing is larger in width than an upper flow adjustment wing.

With the above structure, even if leakage of hydraulic oil from a pipe, or the like, decreases the hydraulic oil in the oil tank and lowers its oil level with the result that the upper flow adjustment wing is exposed above the surface of the oil, as long as the lower flow adjustment wing provided below the upper flow adjustment wing is below the surface, it is possible to cause the return oil to float on the surface. That is, the plurality of adjustment wings provided so as to be aligned in the direction of the depth of the container bring about an advantageous effect that it is possible to deal with large fluctuation of the oil level.

An oil tank according to a fourth invention is the oil tank according to any one of the first to third aspects, in which oil tank, the return pipe includes a branch pipe having a discharge port which is located above the upper operational oil level of the stock oil held in the tank, and which opens onto a space corresponding to a space inside the open end of the container.

With the above structure, the following advantageous effect is brought about. In initial flushing carried out after piping work, air in pipes is expelled by hydraulic oil supplied thereto, and therefore a large amount of air bubbles are contained in the return oil. The return oil containing the large amount of air is discharged to a space above the open end of the container and above the surface of the oil, and therefore the return oil containing the large amount of air bubbles is prevented from spattering in the container, and the air bubbles are prevented from going deep in the stock oil held in the tank body.

Advantageous Effects of Invention

According to the oil tank of the present invention, the return oil returned from the hydraulic circuit is put into and stored in the container, and the return oil overflowing the container is diffused and floated on the surface of the stock oil held in the tank body. Thereby, the return oil is prevented from going toward the bottom of the stock oil, and therefore, even if air bubbles are contained in the return oil from the hydraulic circuit at the time of initial flushing, cleaning flushing, replacement flushing, or normal operation of the hydraulic circuit, the air bubbles are not sucked by the hydraulic pump. Accordingly, there are brought about the advantageous effects: safe operation is provided in the normal operation; the time required from the end of the flushing or change of hydraulic oil to the start of the normal operation is shortened.

DESCRIPTION OF EMBODIMENTS

First Embodiment

Hereinafter, a first embodiment of the present invention will be described with reference to FIG. 1 to FIG. 4(b).

(Oil Tank)

Figure 1:
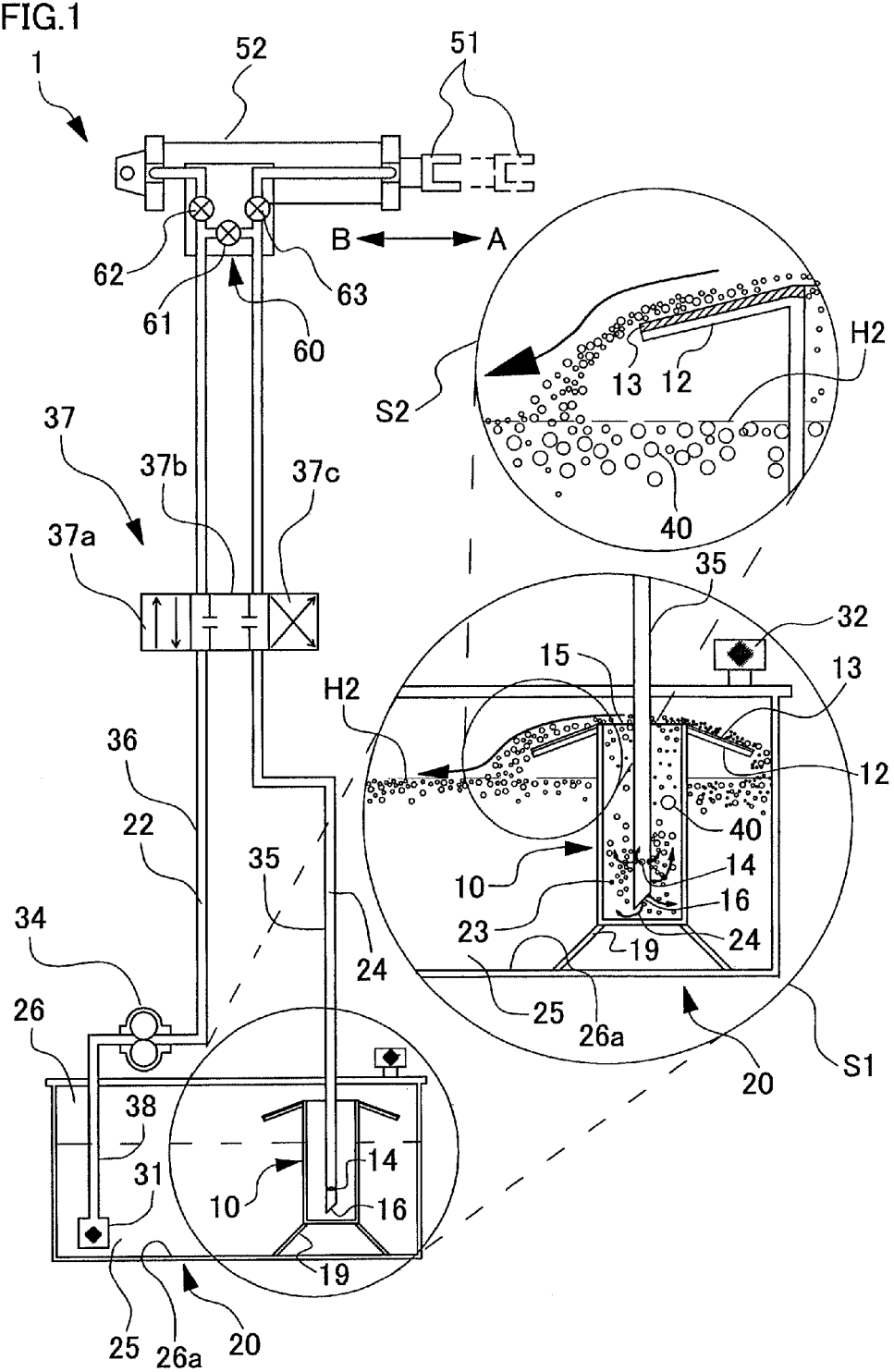
FIG. 1 is an explanatory diagram showing an overall structure of a hydraulic circuit related to a first embodiment of the present invention.

As shown in FIG. 1, an oil tank 20 of this embodiment includes: a tank body 26 which stores oil 25; an intake port 31 which is provided in the vicinity of a bottom of the tank body 26 and to which a sucking side of a hydraulic pump 34 is connected; a return oil inlet 16 through which return oil 24 of hydraulic equipment is returned via a return pipe 35, the return oil 24 resulting from the oil 25 which is sucked through the intake port 31 by the hydraulic pump 34 to be pressurized and then supplied to the hydraulic equipment of a hydraulic circuit 1 as hydraulic pressure oil 22; a container 10 which holds the return oil 24 entering through the return oil inlet 16 as stock oil 23, separately from the oil 25 held in the tank body 26. The container 10 includes a casing 18 which is constituted of side surfaces 11a and a bottom surface 11b, and the casing 18 is provided with an open end 15 positioned above an operational oil level H2 (level of oil surface at the time of operation) of the oil 25 held in the tank body 26 (hereinafter the oil 25 is referred to as "stock oil 25" or "stock oil 25 held in the tank body 26"), that is, the casing 18 has an open top. The oil tank 20 further includes a flange 12 which guides the stock oil 23 which was held in the container 10 and is overflowing through the open end 15 of the container 10 to a surface of the stock oil 25.

When the equipment of the hydraulic circuit 1 is of a type that is operated by hydraulic pressure oil flowing from one end to the other end, as is the case of a hydraulic motor, the oil level H2 of the stock oil 25 held in the tank body 26 is unchanged, because the stock oil 25 held in the tank body 26 merely circulates through the hydraulic circuit 1. However, in reciprocating equipment such as a hydraulic cylinder 50, its capacity at the time when its rod extends is larger than the capacity at the time when the rod contracts. Therefore, when the rod of the hydraulic cylinder 50 extends at its maximum, the oil level H2 of the stock oil 25 held in the tank body 26 is lowest, and the oil level H2 at this time is referred to as a lower operational oil level H2. Meanwhile, when the rod of the hydraulic cylinder 50 contracts at its maximum, the oil level H2 of the stock oil 25 held in the tank body 26 is highest, and the oil level H2 at this time is referred to as an upper operational oil level H2. Note that, when it is not necessary to distinguish between these oil levels of the stock oil 25, the operational oil level H2 is used.

The flange 12 of the oil tank 20 of the first embodiment is configured so that it is slightly inclined from the open end 15 of the container 10 toward the surface of the stock oil 25 held in the tank body 26.

Furthermore, a wire mesh 13 is provided on a surface of the flange 12 of the oil tank 20 of the first embodiment.

Here, the stock oil 25 held in the tank body 26 of the first embodiment is hydraulic oil which is to be supplied to hydraulic equipment such as a hydraulic cylinder which actuates an implement of a industrial machine, for example. Note that, in the present invention, the stock oil 25 is not limited to the hydraulic oil, and may be any other type of oil.

The tank body 26, which is a main part of the oil tank 20, has a box shape, and holds the stock oil 25 functioning as hydraulic oil for actuating the cylinder 50. Note that, the shape of tank body 26 is not limited to the box shape, and may be cylindrical.

The intake port 31 is located in the vicinity of a bottom 26a of the tank body 26, and is provided at an end of an intake pipe 38 which is connected to the hydraulic pump 34. The stock oil 25 is sucked by the hydraulic pump 34 through the intake pipe 38, passes through a pressure oil feed pipe 36 of the hydraulic circuit 1, and then is supplied through a direction switching valve 37 as the hydraulic pressure oil 22 for actuating the hydraulic cylinder 50. Here, "located in the vicinity of the bottom 26a of the tank body 26" means that the intake port 31 is located below the surface of the stock oil 25 held in the tank body 26, and at a position such that: air bubbles 40 existing near the surface are not sucked through the intake port 31; and the stock oil 25 settled at the bottom of the tank body 26 is less likely to be sucked. With the above structure, the stock oil 25 held in the tank body 26 is sucked through the intake port 31 when the hydraulic pump 34 is driven, and then the stock oil 25 is supplied to the hydraulic cylinder 50 as the hydraulic pressure oil 22. Further, in the intake port 31 incorporated is a not-shown filter which prevents dirt, dust or the like in the stock oil 25 from entering the hydraulic circuit 1.

As shown in a circle S1 of FIG. 1, the return oil inlet 16 is provided at an end of the return pipe 35. Through the return oil inlet 16, the return oil 24 from the hydraulic cylinder 50 of the hydraulic circuit 1 enters the container 10 passing through the return pipe 35, and the return oil 24 is stored therein as the stock oil 23. The return oil inlet 16 is provided in the vicinity of the bottom 11b of the container 10 so that the return oil 24 entering through the return oil inlet 16 is held separately from the stock oil 25 held in the tank body 26, and the return oil 24 passing through the return pipe 35 and then entering through the return oil inlet 16 is stored in the container 10 as the stock oil 23. The stock oil 23 is mixed with the stock oil 25 held in the tank body 26 only at the surface of the stock oil 25. Specifically, the return oil 24 enters through the return oil inlet 16 which opens in the vicinity of the bottom 11b of the container 10, and is stored in the container 10 as the stock oil 23, and the stock oil 23 is mixed with the stock oil 25 when the stock oil 23 overflows through the open end 15.

(Container)

Figure 2:
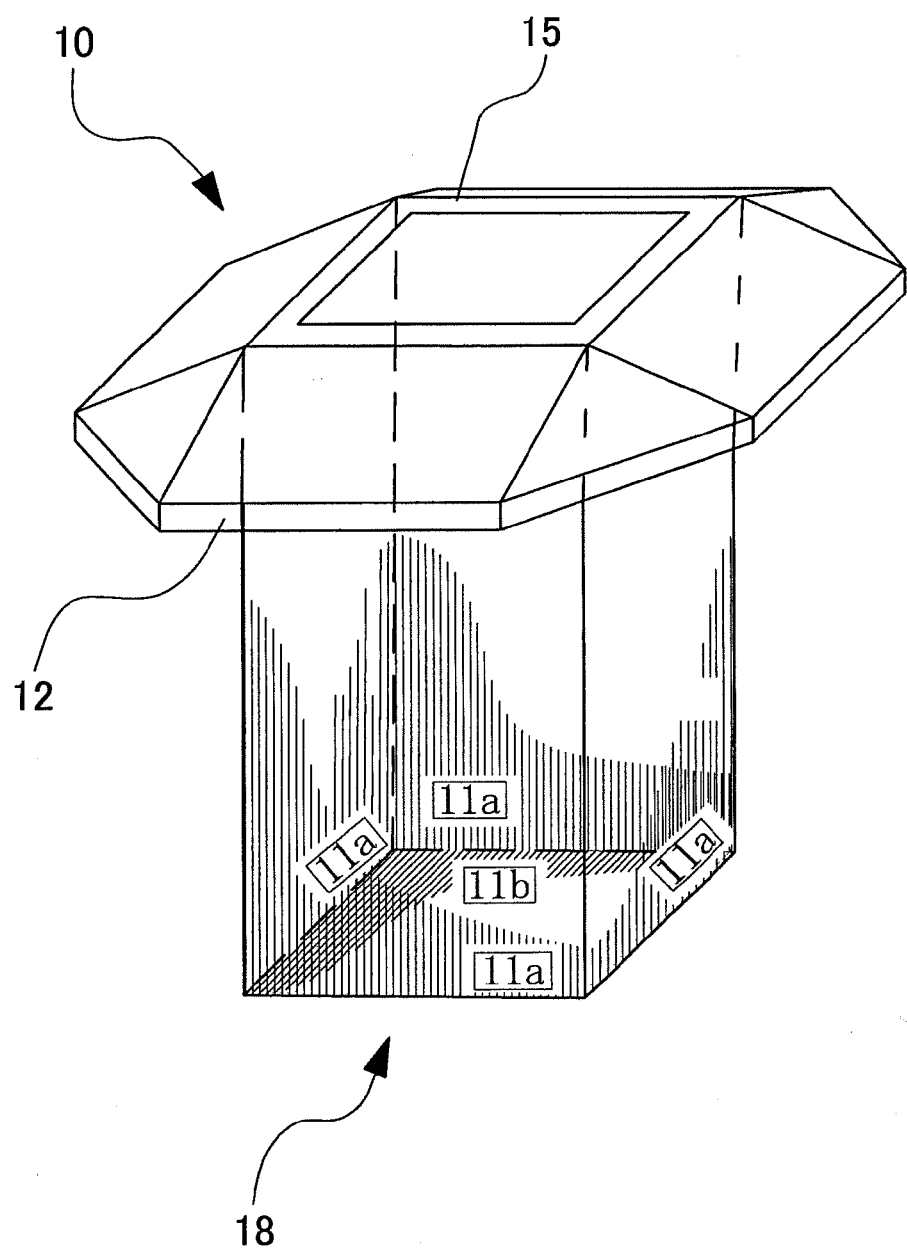
FIG. 2 is an explanatory diagram showing a structure of a container related to the first embodiment of the present invention.

As shown in FIG. 2, the container 10 includes the casing 18 as a main part. The casing 18 is constituted of the bottom 11b and the plurality of side surfaces 11a and has the open end 15 at its top. Further, the flange 12 is provided to the open end 15 of the container 10. The flange 12 is slightly inclined downward from the open end 15 of the container 10. Note that, the container 10 does not have to have a rectangular parallelepiped shape, and may have a cylindrical shape, for example. In that case, the flange 12 may be provided along the open end 15 of the cylindrical container. In addition, the position at which the flange 12 is provided is not limited to the open end 15 of the container 10. For example, the flange 12 may be provided to the side surfaces 11a of the container 10. The flange 12 may be provided at any position on the side surfaces 11a of the container 10, as long as the flange 12 is provided at a position above or around the surface of the stock oil 25 held in the tank body 26 so as to surround the open end 15.

As shown in the circle S1 of FIG. 1, the container 10 is fixed by two supports 19 which connect the bottom 11b to the bottom 26a of the tank body 26. When the container 10 is attached, the return pipe 35 is inserted therein so that its leading end is positioned in the vicinity of the bottom 11b of the container 10, and at the leading end, the return oil inlet 16 opens. Here, the cross section of the container 10 is designed to be sufficiently larger than the cross section of the return pipe 35, in order to prevent the return oil 24 entering through the return oil inlet 16 via the return pipe 35 from spattering in the container 10. Specifically, the cross section of the bottom 11b of the container 10 is designed so that: (i) a velocity at which the oil having entered the container 10 through the inlet 16 flows upward while increasing in the container 10 as the stock oil 23 and (ii) a velocity at which the stock oil 23 having overflowed through the open end 15 of the container 10 flows down on the flange 12 facilitate escape of air bubbles 40 on the flange 12 into an air space and allow the stock oil 23 to be gently returned to the surface of the stock oil 25 held in the tank body 26. Further, the container 10 is attached so as to protrude from the surface of the stock oil 25 held in the tank body 26, so that the flange 12 provided to the open end 15 is positioned above the oil level H2 of the stock oil 25 held in the tank body 26. This allows the flange 12 to be slightly inclined from an upper end portion of the container 10 toward the surface of the stock oil 25 held in the tank body 26. Furthermore, the wire mesh 13 is provided on the surface of the flange 12.

The velocity at which the stock oil 23 flows down on the flange 12 is the velocity which facilitates escape of air bubbles 40 into the air space is facilitated and which allows the return oil 24 to be gently returned to the surface of the stock oil 25 held in the tank body 26. Here, as shown in a circle S2 of FIG. 1, the stock oil 23 slowly flowing down on the flange 12 spreads on the flange 12 in the form of a thin layer. This decreases a distance for which air bubbles 40 contained in the stock oil 23 move to escape to the air space, and the air bubbles 40 are removed from the stock oil 23 while the stock oil 23 flows down on the flange 12. Further, the wire mesh 13 provided on the flange 12 slows down the velocity at which the stock oil 23 flows down, and this facilitates dispersion of the air bubbles 40 into the air.

Further, the return oil inlet 16 to which the return pipe 35 is connected has an oval shape obtained by cutting the pipe at an oblique angle in order to have a section larger than that of the return pipe 35. Meanwhile, a plurality of holes 14 bored in the vicinity of the return oil inlet 16 function to discharge the return oil 24 when the return oil 24 entering from the return pipe 35 is increased sharply, thereby to prevent a pressure in the return pipe 35 from being increased by the return oil 24.

An air breather 32 is provided on a top panel of the tank body 26. The air breather 32 filters, using a filter provided inside therein, air coming in and going out along with fluctuations of the surface of the stock oil 25 held in the tank body 26, which fluctuations caused by the operation of the hydraulic cylinder provided in the hydraulic circuit 1, and thereby prevents entry of dirt or moisture.

The oil tank 20 having the above structure stores oil 25 which is to be supplied as the hydraulic pressure oil 22 to the hydraulic circuit 1 constituted of the hydraulic pump 34, the direction switching valve 37, a multifunction valve 60, the hydraulic cylinder 50, and the like. Although the hydraulic circuit 1 of the first embodiment is a hydraulic circuit for the hydraulic cylinder 50, the application of the hydraulic circuit is not limited thereto, and the hydraulic circuit may be used for other applications.

(Pump)

In the hydraulic pump 34, two gears rotate in mesh, and thereby the stock oil 25 held in the tank body 26 is sucked through the intake port 31, and then is supplied, as the hydraulic pressure oil 22, to the hydraulic circuit 1 provided with the hydraulic cylinder 50. Note that, the hydraulic pump 34 is not limited to such a gear pump, and any other types of hydraulic pumps may be used.

(Cylinder)

The hydraulic cylinder 50 includes: a cylinder tube 52; a rod 51 reciprocating in the cylinder tube 52; and a piston slidably fitted into the cylinder tube 52 and fixed to the rod 51. Hydraulic pressure oil supplied/discharged by the hydraulic pump 34 causes the piston to slide in the cylinder tube 52, so the hydraulic cylinder 50 operates in a direction A, in which the rod 51 extends, or in a direction B, in which the rod 51 contracts. Here, an oil chamber used for the operation in the direction in which the rod 51 extends (head-side pressure chamber) is larger in capacity than an oil chamber used for the operation in the direction in which the rod 51 contracts (rod-side pressure chamber). With this structure, as the hydraulic cylinder 50 operates, the oil level H2 of the stock oil 25 held in the tank body 26 fluctuates up and down.

(Direction Switching Valve)

The direction switching valve 37 is provided between the hydraulic pump 34 and the hydraulic cylinder 50, and has three changeover positions: a left changeover position 37a; a neutral position 37b; and a right changeover position 37c. By shifting the direction switching valve 37 to one of these changeover positions, a direction in which hydraulic pressure oil flows is changed. When the direction switching valve 37 is shifted to the left changeover position 37a, hydraulic pressure oil 22 from the hydraulic pump 34 is supplied so that the rod 51 of the hydraulic cylinder 50 extends in the direction A, and a discharge side of the hydraulic cylinder 50 is connected to the return pipe 35. Meanwhile, when the direction switching valve 37 is shifted to the right changeover position 37c, hydraulic pressure oil 22 from the hydraulic pump 34 is supplied so that the rod 51 contracts in the direction B, and the discharge side of the hydraulic cylinder 50 is connected to the return pipe 35. Further, when the direction switching valve 37 is shifted to the neutral position 37b, blockage is provided between the pressure oil feed pipe 36 and the hydraulic cylinder 50 and between the return pipe 35 and the hydraulic cylinder 50, so that the rod 51 of the hydraulic cylinder 50 does not extend/contract.

(Multifunction Valve)

The multifunction valve 60 in the first embodiment is directly attached to the hydraulic cylinder 50, and includes three stop valves 61, 62, and 63. The stop valve 62 of the multifunction valve 60 functions to open/close communication between the pressure oil supply/discharge pipe 36a and the hydraulic cylinder 50, while the stop valve 63 functions to open/close communication between the pressure oil supply/discharge pipe 36b and the hydraulic cylinder 50. Further, the stop valve 61 functions to open/close communication between the pressure oil supply/discharge pipes 36a and 36b. By using the multifunction valve 60 having the above structure, i.e., by opening/closing the stop valve 62, 63 and the stop valve 61, it is possible to find a damaged portion in the hydraulic cylinder 50, the pressure oil supply/discharge pipe 36a, or the pressure oil supply/discharge pipe 36b. Further, various types of flushing (initial flushing, cleaning flushing, and replacement flushing) can be carried out by: opening the stop valve 61 to connect the pressure oil supply/discharge pipe 36a to the pressure oil supply/discharge pipe 36b with the hydraulic cylinder 50 being bypassed; and circulating the stock oil 25 held in the tank body 26 through the hydraulic circuit 1.

(Operation in the First Embodiment)

Next, with reference to FIGS. 3 and 4, operation in the first embodiment will be described.

Now, description will be given on an operation of the initial flushing, in which pressure oil is charged only in the hydraulic circuit 1 after piping work is completed. First, as shown in FIG. 3(*a*), oil is supplied to the tank body 26 by an operator through a not-shown supply port, and is stored as the stock oil 25. At this time, the stock oil 25 has not entered the hydraulic circuit 1 or the container 10. The oil level of the stock oil 25 held in the tank body 26 in a state where the tank body 26 is filled with the stock oil 25 and the initial flushing has not been carried out, is referred to as oil level H1.

Figure 3:
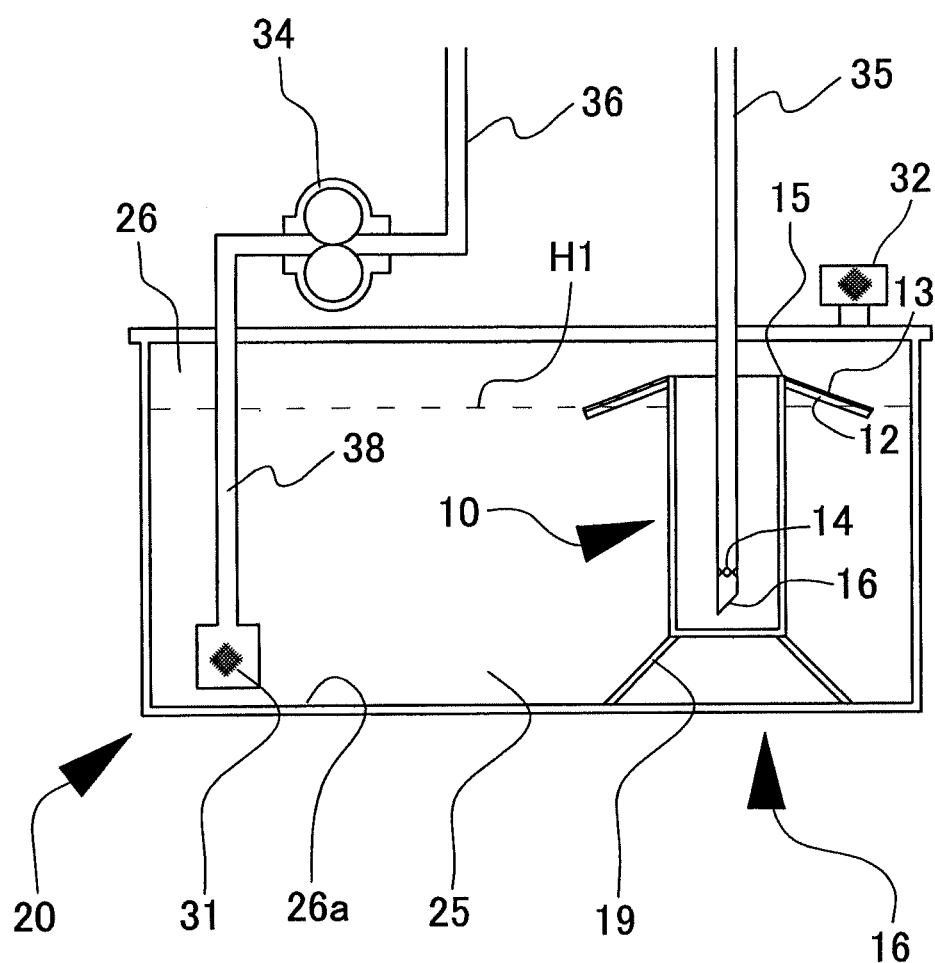
FIG. 3(a) is an explanatory diagram showing a state in which oil is stored in an oil tank related to the first embodiment of the present invention.
FIG. 3(b) is an explanatory diagram showing a state in which oil stored in the oil tank related to the first embodiment of the present invention is sucked.
Figure 3:
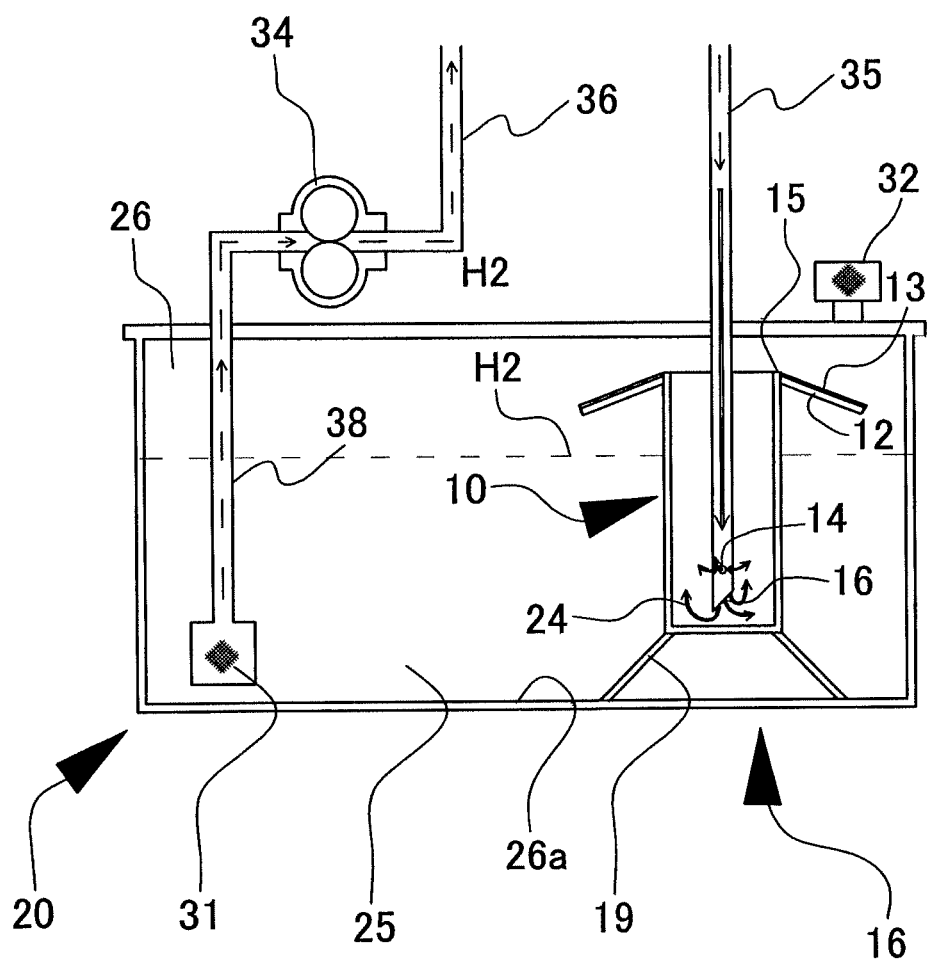

Then, as shown in FIG. 3(*b*), the hydraulic pump 34 is driven, and thereby the stock oil 25 is sucked by the hydraulic pump 34 through the intake port 31, and is supplied to the hydraulic circuit 1 as the hydraulic pressure oil 22. Here, the stop valves 62 and 63 of the multifunction valve 60 are closed, while the stop valve 61 is opened, and the direction switching valve 37 is shifted to the left changeover position 37a. Therefore, the hydraulic pressure oil 22 from the hydraulic pump 34 is not supplied to the hydraulic cylinder 50, but is circulated through the pressure oil supply/discharge pipe 36a and via the stop valve 61, and then circulated through the pressure oil supply/discharge pipe 36b and via the direction switching valve 37. Then the hydraulic pressure oil 22 is returned to the container 10 through the return pipe 35. In other words, the hydraulic pressure oil 22 which has flowed out through the intake port 31 and has been pressurized in the hydraulic pump 34 passes through the pressure oil feed pipe 36 and via the direction switching valve 37, then passes through the pressure oil supply/discharge pipe 36a, the stop valve 61, and the pressure oil supply/discharge pipe 36b, and then passes via the direction switching valve 37 and through the return pipe 35, and thereafter, the hydraulic pressure oil 22 is returned as the return oil 24. Therefore, the hydraulic pressure oil 22 passes while expelling air existing in the above pipes and the direction switching valve 37, and then is returned to the container 10 through the return oil inlet 16. At this time, since the container 10 is empty, the air expelled by the return oil 24 is discharged to an air space in the container 10.

Figure 4:
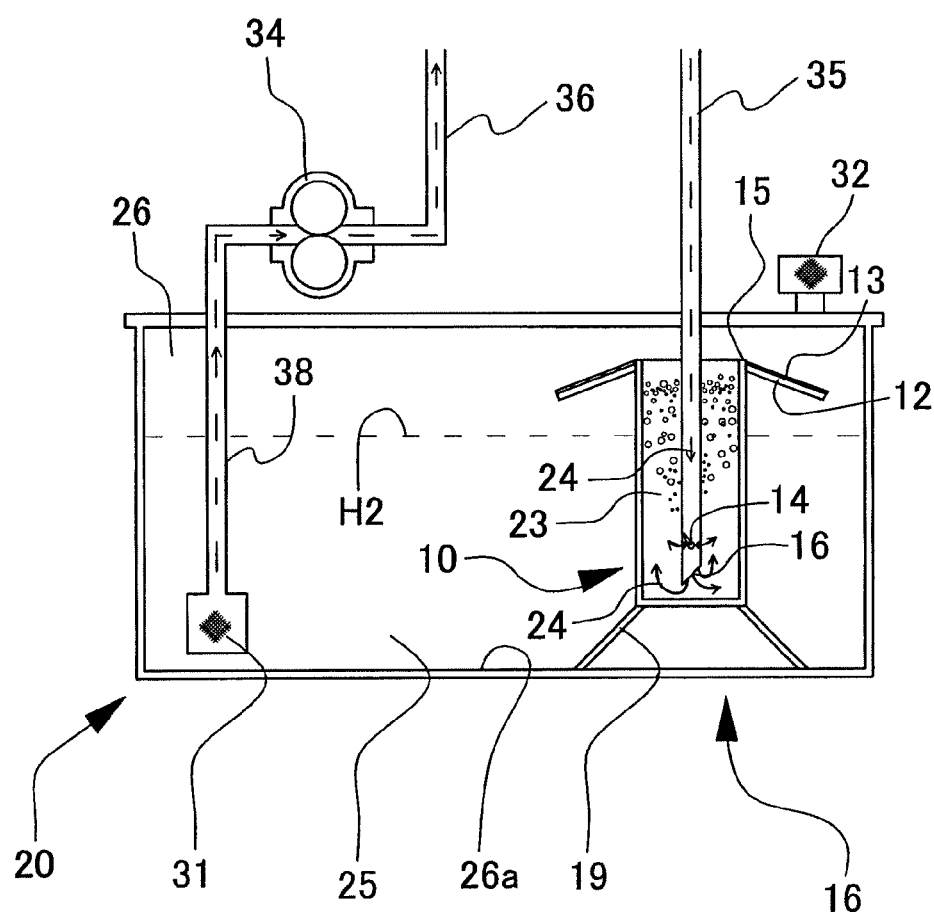
FIG. 4(a) is an explanatory diagram showing a state in which return oil enters the oil tank related to the first embodiment of the present invention.
FIG. 4(b) is an explanatory diagram showing a state in which the return oil overflows the container related to the first embodiment of the present invention.
Figure 4:
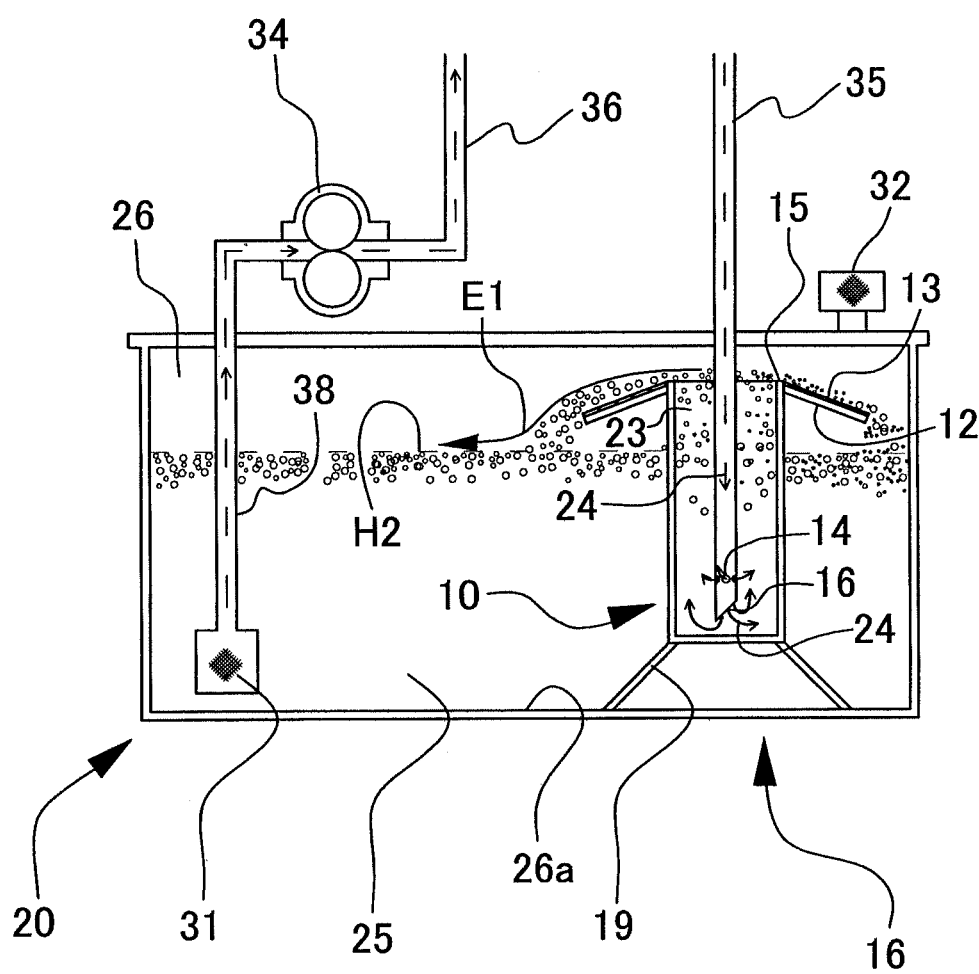

Then, as shown in FIG. 4(*a*), after the air having existed in the hydraulic circuit 1 escapes to the air space in the container 10, the stock oil 25 which has been circulated in the hydraulic circuit 1 enters, as the return oil 24, into the container 10 through the return oil inlet 16, and the return oil 24 is held as the stock oil 23. With the stock oil 23 stored in the container 10, the container 10 is filled, and thereby the oil level of the stock oil 23 is raised to the upper end portion of the container 10. Note that the stock oil 23 at this time contains air which has not escaped to the air space, in the form of air bubbles 40.

As shown in FIG. 4(*b*), the stock oil 23 held in the container 10 is increased with time and then overflows through the open end 15 of the container 10, and flows down on the wire mesh 13 of the flange 12 as indicated with an arrow E1, toward the surface of the stock oil 25 held in the tank body 26. At this time, since the stock oil 23 flowing down on the flange 12 is in the form of the thin layer, some of the air bubbles 40 contained in the stock oil 23 are removed therefrom to the air space. Further, the air bubbles 40 are brought into contact with the wire mesh 13 provided on the surface of the flange 12, and this slows down the velocity at which the stock oil 23 flows down, thereby to facilitate removal of the air bubbles 40 into the air. Thus, since the stock oil 23 containing the air bubbles 40 flows toward the surface of the stock oil 25 held in the tank body 26 as indicated with the arrow E1, the stock oil 23 is mixed with the stock oil 25 while receiving a force which diffuses the stock oil 23 on the surface of the stock oil 25 held in the tank body 26. Since this causes the stock oil 23 to be diffused on and detained around the surface of the held stock oil 25, the stock oil 25 which does not contain the air bubbles 40 is always sucked through the intake port provided in the vicinity of the bottom of the tank body 26.

Next, description will be made on an operation of the initial flushing, in which the hydraulic pressure oil 22 is supplied also in the hydraulic cylinder 50. In a state where the pipes such as the pressure oil feed pipe 36 and the return pipe 35 of the hydraulic circuit 1 are filled with oil through the above-described operation of the initial flushing for the pipes, the direction switching valve 37 is shifted to the neutral position 37b, so that the oil is kept within the hydraulic circuit 1. Then, the stop valves 62 and 63 of the multifunction valve 60 are opened, while the stop valve 61 is closed. Further, the direction switching valve 37 is shifted between the left changeover position 37a and the right changeover position 37c alternately, to advance/retract the rod 51 of the hydraulic cylinder 50. As a result, the hydraulic cylinder 50 is filled with the oil 25. With this operation, air having existed in the cylinder 50 passes through the return pipe 35, in the form of air bubbles 40, together with the return oil 24 and then is held in the container 10. Thereafter, the air bubbles 40 overflow the container 10, pass on the flange 12, and then are returned to the surface of the stock oil 25 which has been held in the tank body 26. Consequently, all the air having exited in the hydraulic circuit 1 is removed. After the above-described operations of initial flushing for the hydraulic circuit 1 and its equipment are completed, the circuit and the hydraulic equipment are filled with oil. Therefore, the stock oil 25 held in the tank body 26 is decreased corresponding to this, with the result that the oil level is lowered to the oil level H2.

Note that, the hydraulic circuit 1 of this embodiment is provided with the multifunction valve 60 which has the stop valves 62 and 63 and the stop valve 61 as one member, however, these stop valves may be provided individually in the hydraulic circuit 1. The use of the multifunction valve 60 minimizes lengths of pipes existing among the stop valve 62, stop valve 63 and stop valve 61, and this minimizes an amount of air which has to be removed from the hydraulic circuit 1.

Air bubbles 40 remaining in the stock oil 23, which is the return oil 24 returned to and held in the container 10, are detained around the surface of the stock oil 25 held in the tank body so as to be diffused on the surface after moving along the container 10 and the flange 12 as indicated with the arrow E1. Since the stock oil 23 does not go deep in the stock oil 25 held in the tank body 26, it is possible to always supply oil which does not contain air bubbles 40 through the intake port 31 to the hydraulic pump 34. Meanwhile, the oil level of the stock oil 25 held in the tank body 26 at this time is the oil level H2, which is the oil level at the time when the oil is decreased by an amount required to fill the hydraulic circuit 1 and the hydraulic cylinder 50. When the hydraulic cylinder 50 operates, the oil level H2 fluctuates corresponding to the difference in capacity of the hydraulic cylinder 50. Air in the tank body 26 which is increased/decreased with the fluctuation of the oil level H2 goes in/out via the air breather 32.

Second Embodiment

Figure 5:
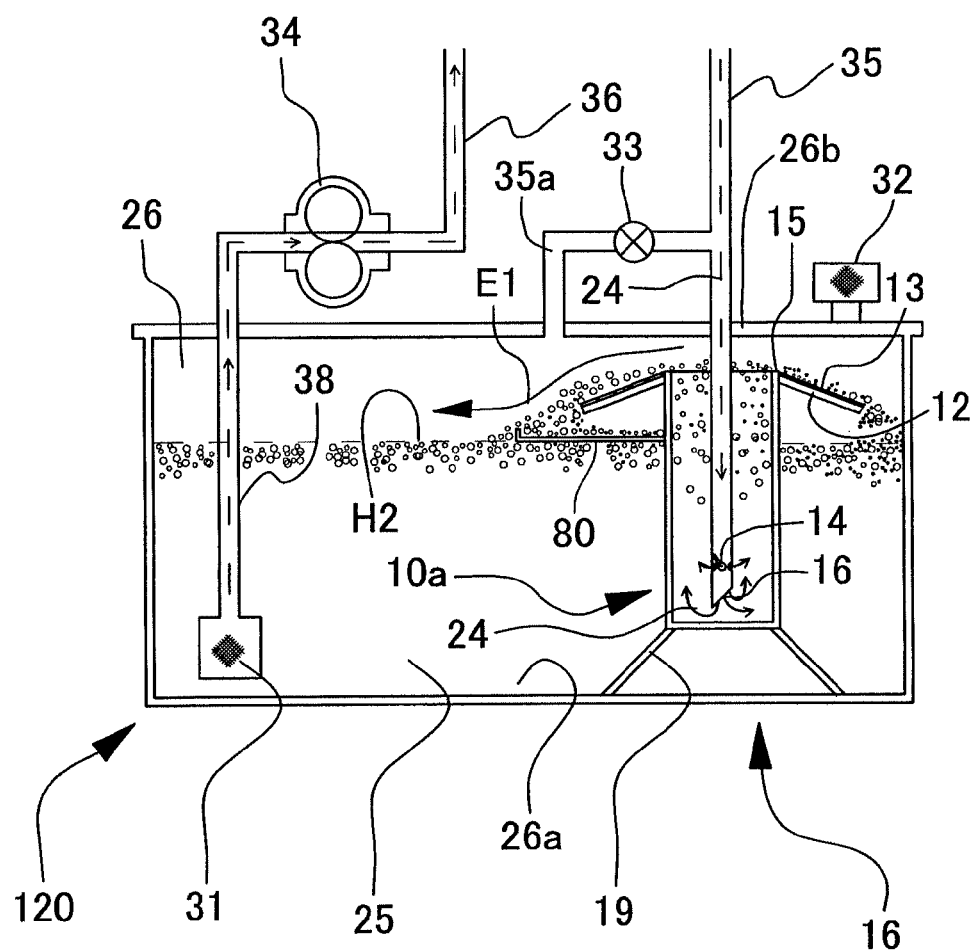
FIG. 5(a) is an explanatory diagram showing an oil tank related to a second embodiment of the present invention.
FIG. 5(b) is an explanatory diagram showing an oil tank related to a third embodiment of the present invention.
Figure 5:
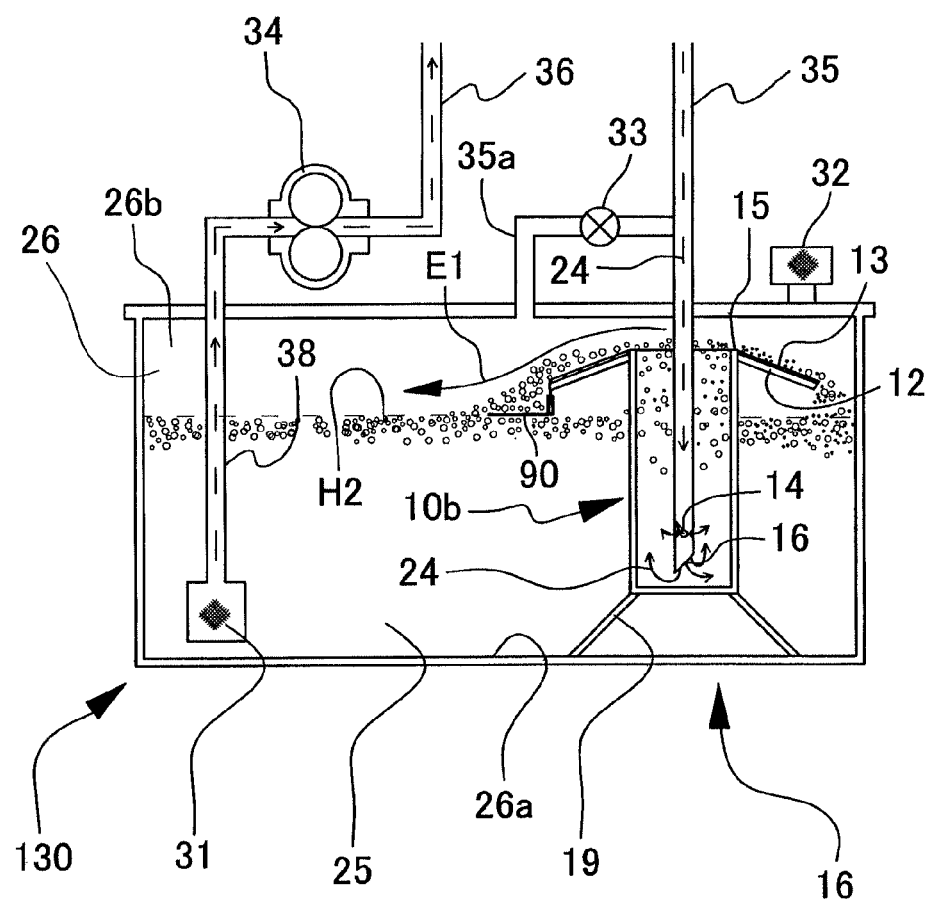

The following describes a second embodiment shown in FIG. 5(a). An oil tank 120 may be provided with a sieve 80 which receives stock oil 23 which was in a container 10a and is guided by the flange 12, at the surface of stock oil 25 held in the tank body 26. The sieve 80 has a mesh. The mesh receives the stock oil 23 flowing down on the flange 12 from the container 10a and absorbs a drop impact, and thereby it prevents the stock oil 23 from going deep in the stock oil 25 which has been stored, and diffuses the stock oil 23 on the surface of the stock oil 25.

Figure 9:
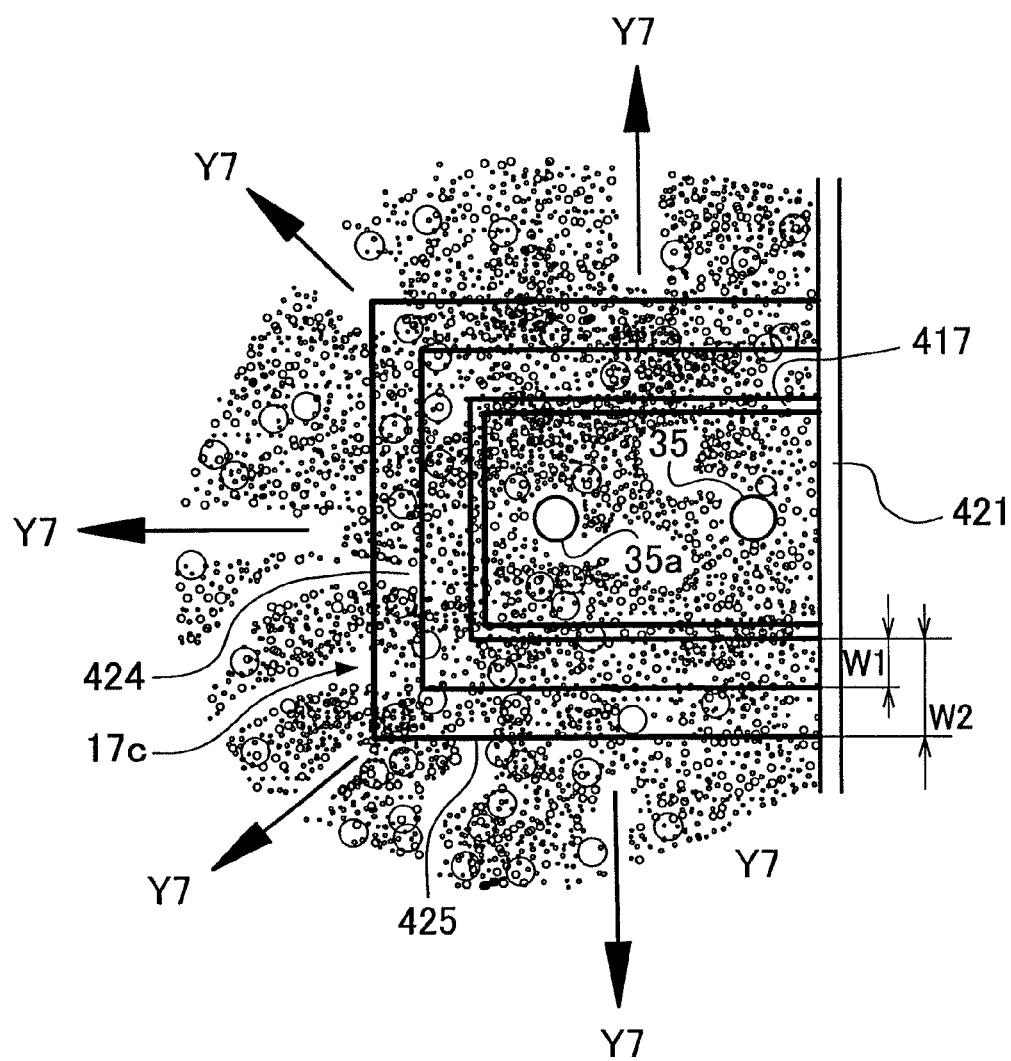
FIG. 9 is a view taken along A-A' of FIG. 8, showing dispersion of bubbles.

That is, even when return oil 24 containing air bubbles 40 is stored in the container 10a as the stock oil 23, the sieve 80 functions to convert the stock oil 23 dropping with momentum to a flow along the surface of the stock oil 25 held in the tank body 26. Therefore, as shown in FIG. 9, the stock oil 23 from the container 10a is diffused along the surface of the stock oil 25 held in the tank, so it is possible to prevent the air bubbles 40 from going deep in the stock oil 25. Further, the air bubbles 40 are prevented from intruding deeply, on the momentum of flow, into the stock oil which has been stored, and this further ensures that the air bubbles 40 are detained around the surface of the oil.

Third Embodiment

Further, an oil tank 130 of a third embodiment shown in FIG. 5(b) is provided with a float portion 90 which receives stock oil 23 guided by the flange 12, at a position near the surface of stock oil 25 held in the tank body 26. The float portion 90 floats on the surface of the stock oil 25 which has been stored in the tank body 26, and is configured to fluctuate with rise or fall of the oil level of the stock oil 25 held in the tank body 26. With this configuration, the stock oil 23 which has flowed down on the flange 12 slowly flows on the float portion 90 floating on the surface of the stock oil 25 before being returned to the surface of the stock oil 25 held in the tank body 26, and then the stock oil 23 is returned onto the surface of the stock oil 25 held in the tank body 26. Thus, even when return oil 24 containing air bubbles 40 is to be returned to the surface of the oil with momentum, such momentum is converted by the float portion 90 to a flow in a direction parallel to the surface of the stock oil 25, and the stock oil 23 is diffused and floated on the surface of the stock oil 25 held in the tank body 26. This prevents the air bubbles 40 from going into the stock oil 25 by an impact at the time of contacting the surface of the oil. As described above, the air bubbles 40 are prevented from going deep in the stock oil 25 held in the tank body 26 on the momentum of flow, and this further ensures that the air bubbles 40 are detained around the surface of the oil.

As shown in FIGS. 5(a) and 5(b), in the second embodiment and the third embodiment, the return pipe 35 may branch into two pipes before the return pipe 35 enters the tank body 26. Specifically, the return pipe 35 is configured so that: the return pipe 35 communicates with to the container 10a, 10b through the return oil inlet 16; a branch return pipe 35a branched off from the return pipe 35 extends via a stop valve 33 and has an end opening onto an air space in the tank body 26 and above the above-described sieve 80 or the float portion 90. Note that, the stop valve 33 is operated manually with its lever, to open/close the branch return pipe 35a. With this structure, even when the return oil 24 returned to the container 10a, 10b is stored as the stock oil 23, air in the hydraulic circuit 1 is able to be discharged to the air space of the tank body 26. Further, even if a large amount of air is ejected from the branch return pipe 35a to the air space of the tank body 26, the ejected air collides with the sieve 80 or the float portion 90, with the result that the air is diffused in the direction parallel to the surface of the stock oil 25 held in the tank body 26.

That is, when the container 10a, 10b is filled with the stock oil 23, the pressure in the pipe toward the container 10a, 10b is high. Accordingly, by opening the stop valve 33, air expelled by the return oil 24 is forwarded to the branch return pipe 35a and is discharged to the air space of the tank body 26. After the large amount of air having existed in the pipes is discharged to the air space, the stop valve 33 is closed. Thereby, the return oil 24 containing air bubbles 40 is now forwarded toward the container 10a, 10b, so that the return oil 24 is caused to enter the container 10a, 10b through the return oil inlet 16. With the use of the branch return pipe 35a, air in the hydraulic circuit 1 is reliably discharged to the air space, even if the hydraulic circuit 1 includes a plurality of cylinders 50 and a plurality of pipes associated therewith.

Summary of the Second and Third Embodiment

As described above, the oil tank 120 of the second embodiment is provided with the sieve 80 which receives the stock oil 23 held in the container 10a and then guided by the flange 12, at a position near the surface of the stock oil 25 held in the tank body 26.

With the above structure, even if the stock oil 23 containing air bubbles 40 and held in the container 10a is returned to the surface of the oil with momentum, the sieve 80 absorbs the momentum. As a result, another air bubble 40 is not involved further by an impact at the time of contacting the surface of the stock oil 25 held in the tank body 26, and the air bubbles 40 are prevented from intruding into the oil deeply due to the momentum. Accordingly, it is possible to further ensure that the air bubbles 40 are detained around the surface of the oil.

Furthermore, the oil tank 130 of the third embodiment is provided with the float portion 90 which receives the stock oil 23 held in the container 10b and then guided by the flange 12, at a position near the surface of the stock oil 25 held in the tank body 26.

With the above structure, even if the stock oil 23 held in the container 10b is returned to the surface of the stock oil 25 held in the tank body 26 with momentum, the float portion 90 absorbs the momentum. As a result, the stock oil 23 held in the container 10b does not go deeply into the stock oil 25 held in the tank body 26, and it is possible to further ensure that the stock oil 23 is detained around the surface of the stock oil 25 held in the tank body 26.

Further, in the hydraulic circuit of the second and third embodiment, the return pipe 35 branches into two pipes before reaching the oil tank 120, 130. One of these two pipes has an end functioning as the return oil inlet 16 connected to the return pipe 35 and reaches the inside of the container 30, while the other extends through the stop valve 33 and reaches the air space in the tank body 26.

With the above structure, even when the stock oil 25 is stored in the tank body 26, air in the hydraulic circuit is able to be discharged to the air space of the tank body 26. Further, even if the hydraulic circuit includes a plurality of hydraulic cylinders 50 and a plurality of pipes associated therewith and a large amount of air exists in the hydraulic circuit, the air is reliably discharged to the air space, so that the air does not go into the stock oil 25 held in the tank body 26.

Fourth Embodiment

Figure 6:
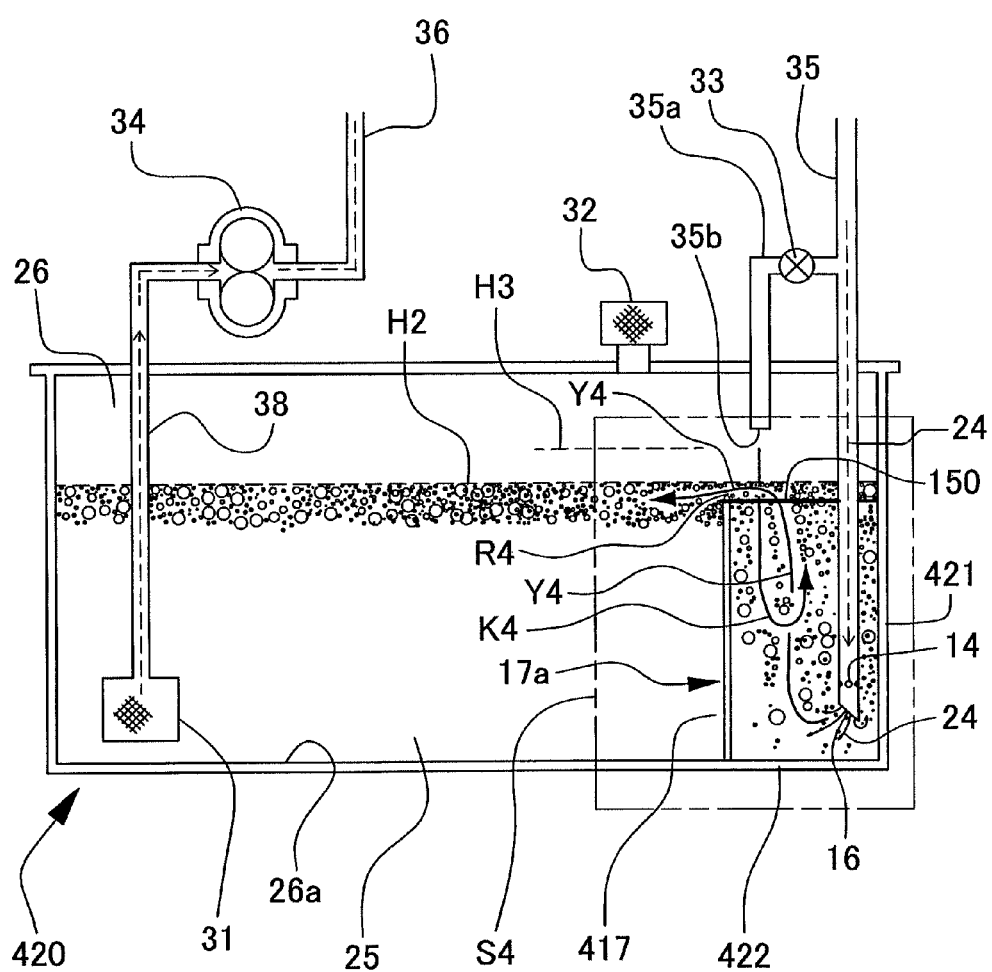
FIG. 6(a) is an explanatory diagram showing an oil tank related to a fourth embodiment of the present invention.
FIG. 6(b) is an enlarged view of a portion labeled by S4 in FIG. 6(a).
Figure 6:
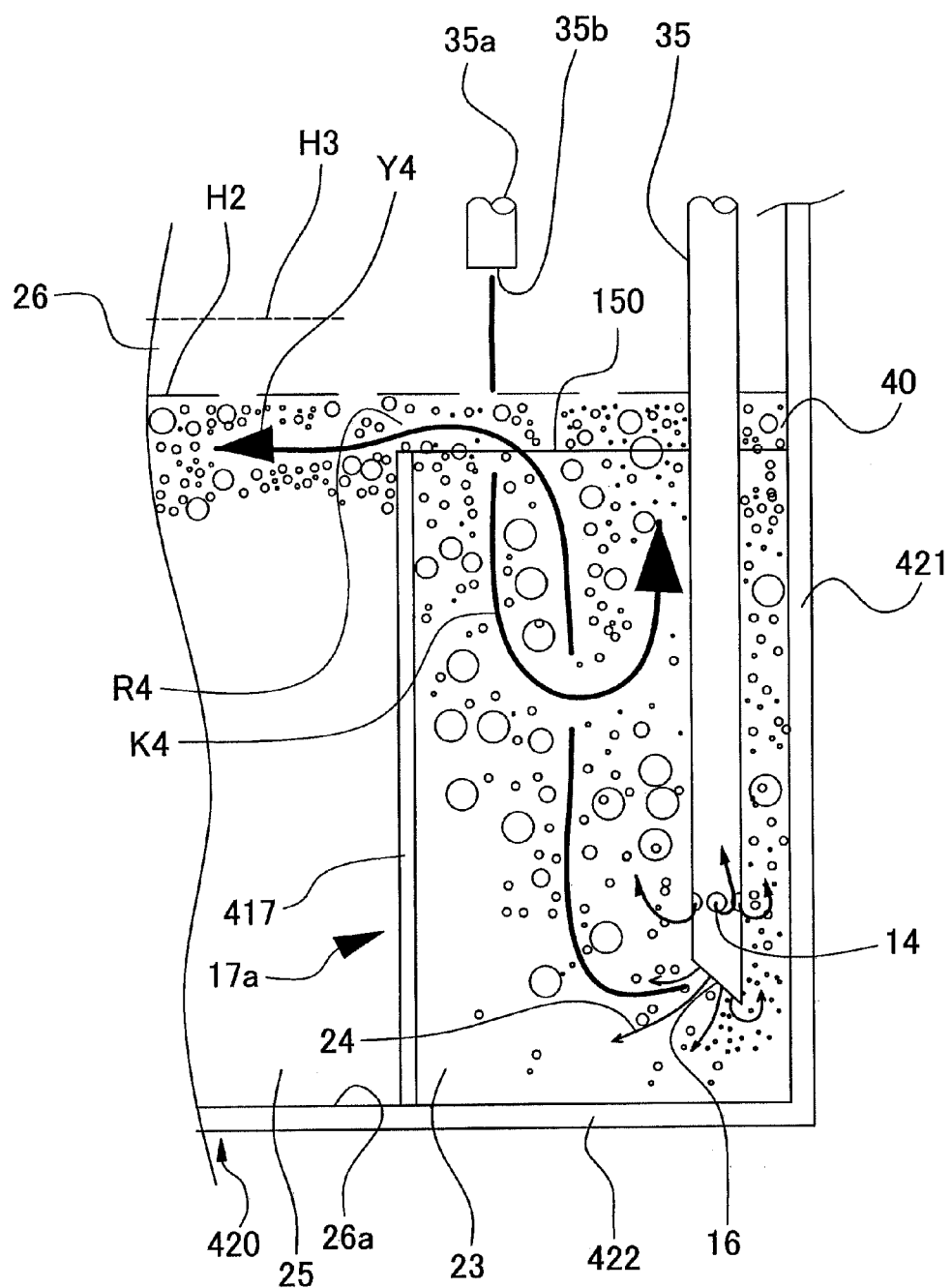

The following describes a fourth embodiment with reference to FIGS. 6(a) and 6(b). In an oil tank 420 of the fourth embodiment, a container 17a is provided, which is a box having an open top and is formed by fixing a member 417, bent into a "U" shape as shown in FIG. 9, to a side panel 421 and a bottom panel 422 of the oil tank 420 using staggered weld. The return pipe 35 of the hydraulic circuit 1 is inserted so that its leading end is positioned in the vicinity of the bottom of the container 17a. The return pipe 35 includes: the return oil inlet 16, formed by cutting the leading end at an oblique angle and thereby having the section larger than that of the return pipe 35; and a plurality of holes 14 bored in the vicinity of the return oil inlet 16. These holes 14 relieve pressure in the container 17a when a large amount of return oil 24 is returned through the return pipe 35. Further, the branch return pipe 35a branched off from the return pipe 35 extends via the stop valve 33 and has an opening 35b which is located above an oil level H3 (oil level of the stock oil 25 held in the tank body 26 in a state where the hydraulic circuit 1 is not filled with oil) and at a position corresponding to a space inside the container 17a. Note that, between the member 417 and the side panel 421 which are staggered welded to each other, a gap is created through which the stock oil 25 passes when oil is stored in the oil tank 420. The oil tank 420 of the fourth embodiment is different from the tank of the first embodiment only in the structure of the container 17a provided inside thereof, and other components are similar to those in the first embodiment. Therefore, the same reference numerals are given to these components respectively, and the description thereof will be omitted.

An open end 150 provided at the top of the container 17a is configured so that it opens below the lower operational oil level H2, that is, the oil level in the state where the initial flushing of the hydraulic circuit 1 has been completed and pressure oil has been supplied to the hydraulic circuit 1 and its hydraulic equipment, i.e., the hydraulic cylinder 50 (oil level at the time when the stock oil 25 held in the oil tank 420 is consumed to a maximum extent); in such a manner that a channel R4 is formed between the open end 150 and the surface at the oil level H2.

In the fourth embodiment having the above structure, pressure oil is supplied from the hydraulic pump 34 to the hydraulic circuit 1, and the return oil 24 enters from the return pipe 35 into the container 17a through the return oil inlet 16 provided in the vicinity of the bottom of the container 17a. The return oil 24 is separated from the stock oil 25 held in the tank body 26 by the container 17a. Therefore, even if air bubbles 40 are contained in the return oil 24, the air bubbles 40 do not go deep in the stock oil 25 held in the tank body 26. The return oil 24 enters through the return oil inlet 16 toward the bottom of the container 17a, and is stored in the container 17a as the stock oil 23. Then, the stock oil 23 is pushed upward in order and overflows through the open end 150. Thereafter, through the channel R4 between the open end 150 and the surface at the oil level H2, the stock oil 23 is diffused along the surface of the stock oil 25 held in the tank body 26 as indicated with an arrow Y4. Note that, the stock oil 23 is diffused along the surface of the oil, as indicated with the arrow Y4 and arrows Y7 of FIG. 9.

Further, the branch return pipe 35a is configured so that, when it is expected that a large amount of air enters through the return pipe 35 in the initial flushing or the like, the entering air is discharged to a space in the tank body 26 by opening the stop valve 33 in advance. The air entering from the branch return pipe 35a plunges into the oil deeply through the surface of the oil, due to its momentum. However, since the branch return pipe 35a is located in a space corresponding to the space inside of a casing constituting the oil tank 420, the air plunges into the inside of the container 17a as indicated with an arrow K4. Therefore, the air is prevented from being mixed with the stock oil 25 held in the tank body 26, and is not sucked through the intake port 31.

Fifth Embodiment

Figure 7:
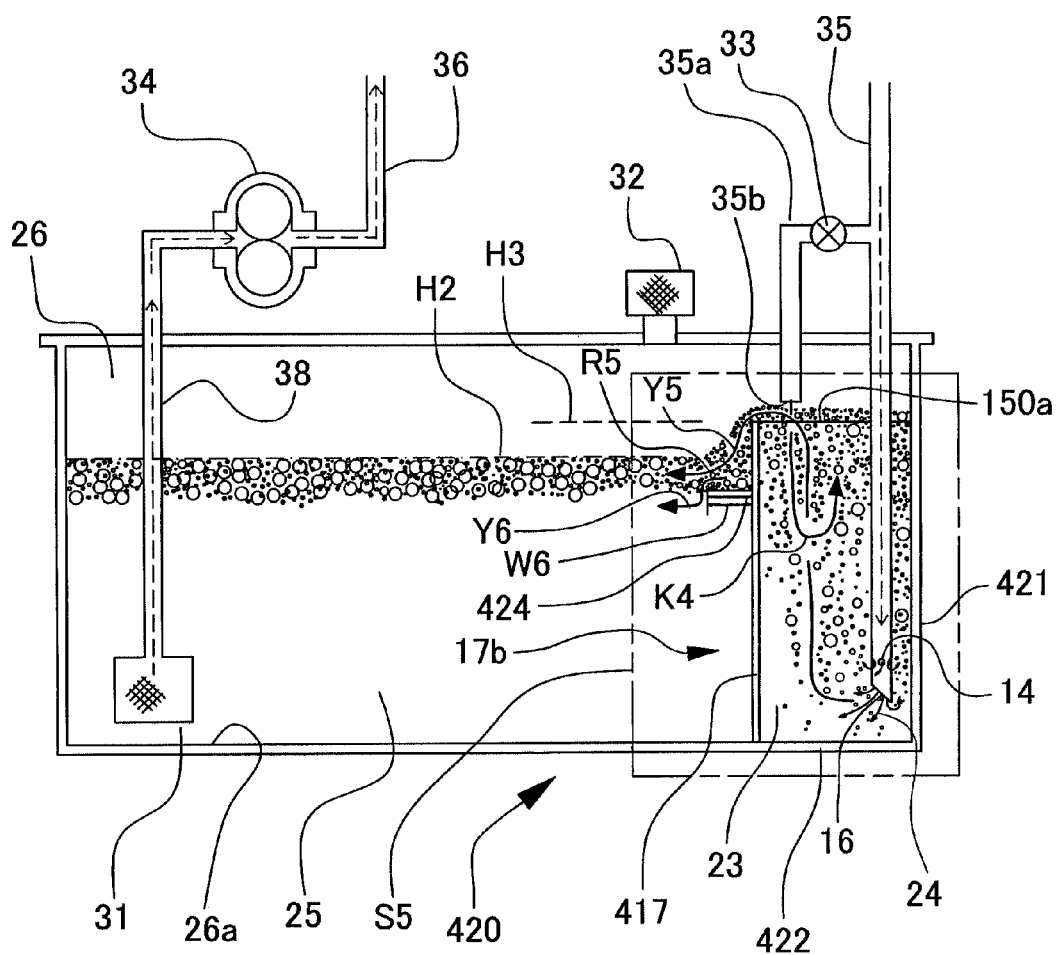
FIG. 7(a) is an explanatory diagram showing an oil tank related to a fifth embodiment of the present invention.
FIG. 7(b) is an enlarged view of a portion labeled by S5 in FIG. 7(a)
Figure 7:
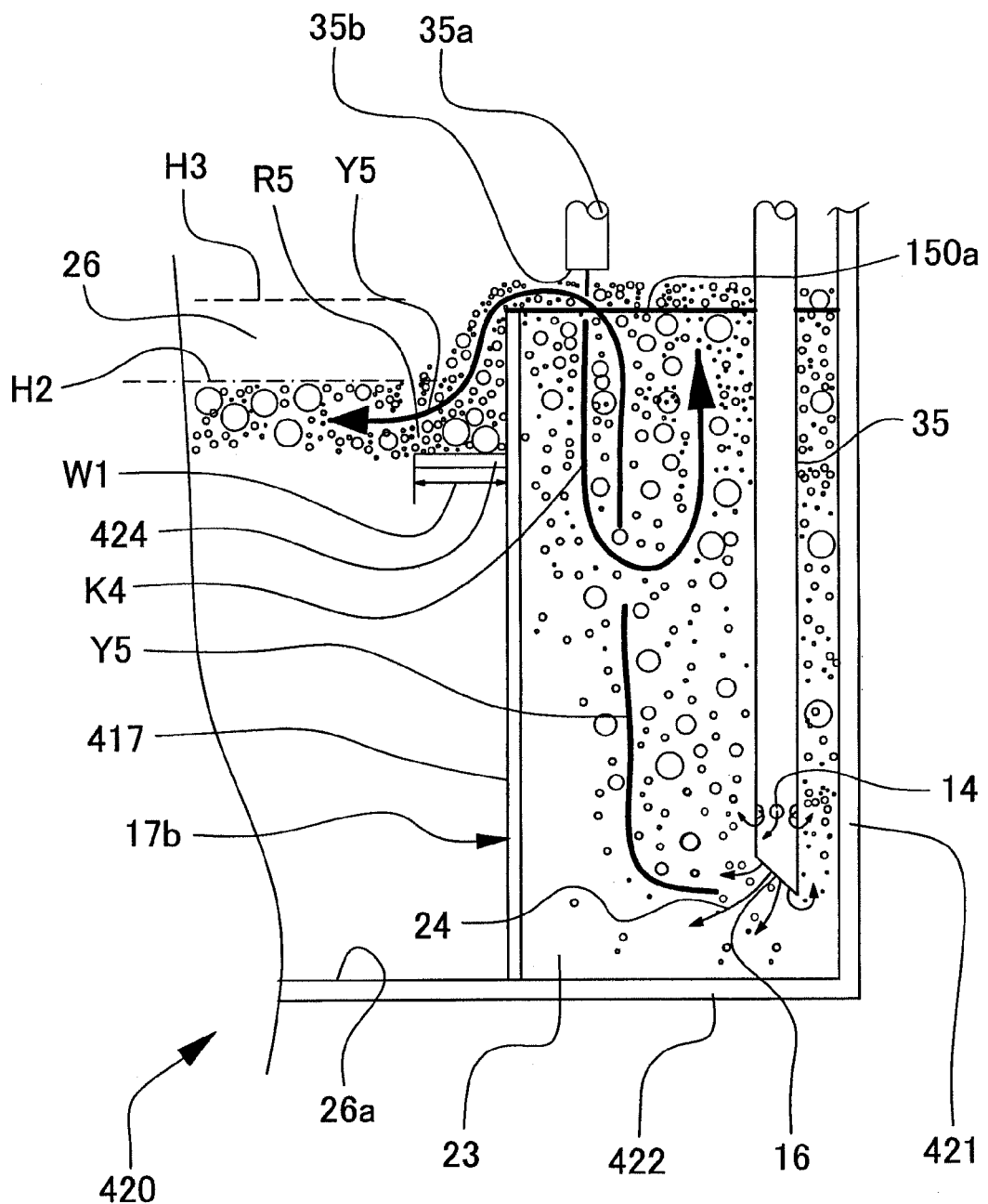

The following describes a fifth embodiment with reference to FIGS. 7(a) and 7(b). An oil tank 420 of the fifth embodiment differs from that of the fourth embodiment only in the structure of a container 17b provided in the oil tank 420, and the other components are similar to those in the fourth embodiment. Therefore, the same reference numerals will be given to these components respectively and the description thereof will be omitted.

An open end 150a provided at a top of the container 17b provided in the oil tank 420 is located on a level with the oil level H3, which is the oil level before the initial flushing of the hydraulic circuit 1 is completed, or is located little above the oil level H3. Further, as shown in FIG. 9, a flow adjustment wing 424 fixed, along the open end 150a, to the member 417 of the container 17b is fixed at a position below the lower operational oil level H2, that is, the oil level in a state where pressure oil has been supplied to the hydraulic circuit 1 and its hydraulic equipment, i.e., the hydraulic cylinder 50 to a maximum extent (the oil level at the time when the stock oil 25 held in the oil tank 420 is consumed to a maximum extent), and is fixed in such a manner that a channel R5 is formed between the flow adjustment wing 424 and the surface at the oil level H2. The flow adjustment wing 424 has a width W1 which allows, through the channel R5, stock oil 23 to flow along the surface at the oil level H2 as indicated with an arrow Y5 when the stock oil 23 in the container 17b overflows through the open end 150a and flows down along the member 417. The flow adjustment wing 424 is thus arranged along the open end 150a, and thereby it causes the stock oil 23 to be diffused on the surface of the stock oil 25 held in the tank body 26 as indicated with the arrows Y7 of FIG. 9.

In the fifth embodiment having the above structure, pressure oil is supplied from the hydraulic pump 34 to the hydraulic circuit 1, and return oil 24 enters from the return pipe 35 into the container 17b through the return oil inlet 16 provided in the vicinity of the bottom of the container 17b. The return oil 24 is separated from the stock oil 25 held in the tank body 26 by the container 17b. Therefore, even if air bubbles 40 are contained in the return oil 24, the air bubbles 40 do not go deep in the stock oil 25 held in the tank body 26. The return oil 24 from the return pipe 35 enters through the return oil inlet 16 in the vicinity of the bottom of the container 17b, and is stored in the container 17b as stock oil 23. The stock oil 23 is pushed upward in order and overflows through the open end 150a. Thereafter, the stock oil 23 flows down along the member 417, and then, through the channel R5 between the flow adjustment wing 424 and the surface at the oil level H2, the stock oil 23 is diffused along the surface of the stock oil 25 held in the tank body 26 as indicated with the arrow Y5. Note that, the oil is diffused along the surface of the oil, as indicated with the arrow Y5 and the arrows Y7 of FIG. 9. Further, the branch return pipe 35a branched off from the return pipe 35 is the same as that of the fourth embodiment in its structure and functions, and therefore the same reference numeral is given thereto and description thereof will be omitted.

Sixth Embodiment

Figure 8:
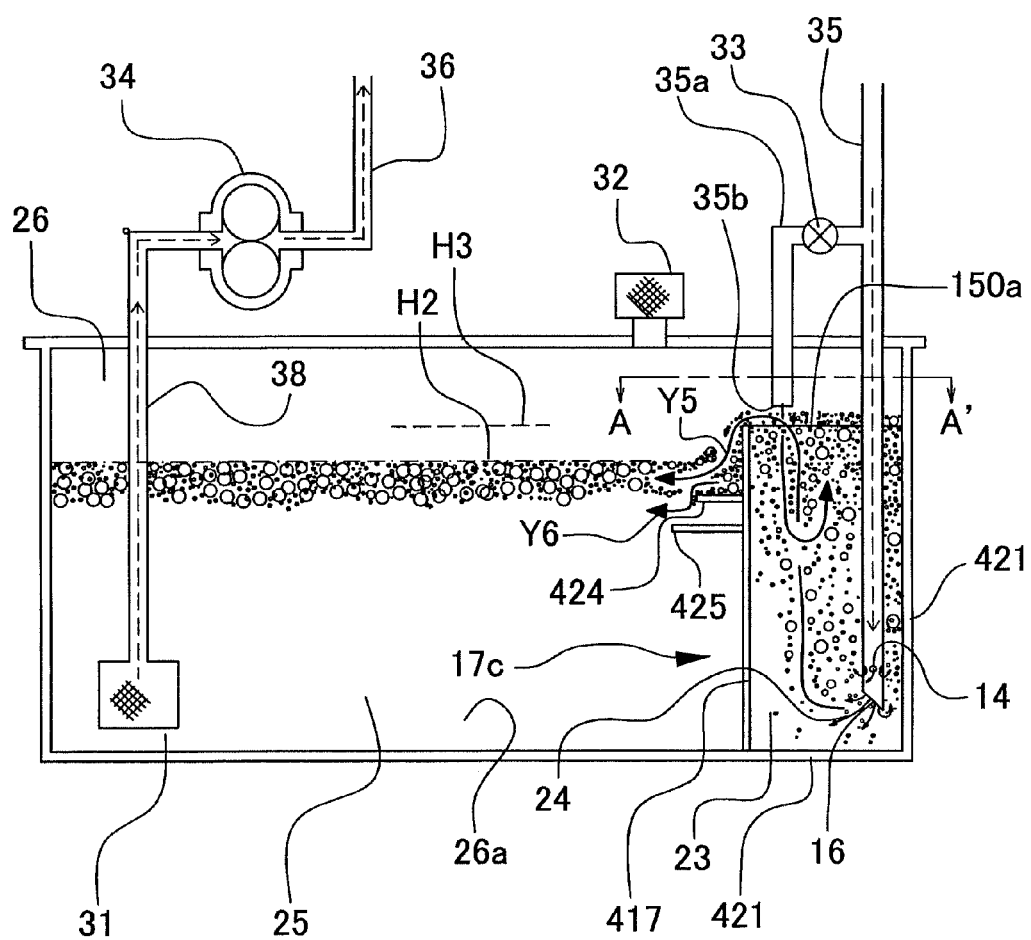
FIG. 8 is an explanatory diagram showing an oil tank related to a sixth embodiment of the present invention.

The following describes a sixth embodiment with reference to FIG. 8. The sixth embodiment differs from the fifth embodiment in that a flow adjustment wing 425 is provided below the flow adjustment wing 424 of the fifth embodiment. Therefore, description will be given on this only. The same reference numerals will be given to other components and description thereof will be omitted.

The flow adjustment wing 425 provided below the flow adjustment wing 424 of a container 17c is substantially parallel to the flow adjustment wing 424. The flow adjustment wing 425 has a width larger than that of the flow adjustment wing 424 so that stock oil 23, which is the return oil 24 returned to and stored in the container 17c and flows down from the open end 150a along the member 417, flows along the surface of the stock oil 25 held in the tank body 26.

In the sixth embodiment having the above structure, when the oil level H2 of the stock oil 25 held in the tank body 26 is kept at a same level as that in the fifth embodiment, the stock oil 23 overflowing through the open end 150a of the container 17c is diffused, along the surface of the stock oil 25 held in the tank body 26, by the flow adjustment wing 424, as indicated with the arrow Y5 and the arrows Y7.

Now, consideration will be given to a case where the oil level H2 is lowered to a level between the flow adjustment wing 424 and the flow adjustment wing 425 for a reason that an operator fails to refill the tank body 26 with oil after oil leak from the tank body 26 or a pipe is fixed, for example. When the oil level H2 is lowered between the flow adjustment wing 424 and the flow adjustment wing 425, the stock oil 23 having overflowed through the open end 150a of the container 17c falls down along the width W1 of the flow adjustment wing 424 toward the surface of the oil. Since the stock oil 23 falls down onto the flow adjustment wing 425 of a width W2, the stock oil 23 is guided so as to be along the surface of the stock oil 25 held in the tank body 26. Therefore, even if the stock oil 25 held in the tank body 26 is greatly decreased and air bubbles are contained in the return oil 24 to be held in the container 17c, the air bubbles do not go deep in the stock oil 25 held in the tank body 26.

The container of the above-described embodiments has a box shape. There has been also described the container formed by staggered welding the member 417 as shown in FIG. 9. However, the container may have a circular section. Further, the container may be made by welding a steel plate at a corner of the oil tank 20, 420 to form an enclosure, and the section of the enclosure may be a triangle or quadrangle.

Hereinabove, the embodiments of the present invention have been described, however, the embodiments as set forth are intended to be illustrative, not limiting. Various changes may be made as needed on specific structures or the like, without departing from the spirit and scope of the invention. Further, functions and effects described in the embodiments of the present invention are just a list of most preferable functions and effects brought about by the present invention. Functions and effects of the present invention are not limited to those described in the embodiments of the present invention.

INDUSTRIAL APPLICABILITY

The present invention is applicable to an oil tank for an industrial hydraulic circuit or for a hydraulic circuit of a construction machine.

REFERENCE SIGNS LIST

1: hydraulic circuit
10: container
11a: side surface
11b: bottom
12: flange
13: wire mesh
14: hole
15: open end
16: return oil inlet
17a: container
17b: container
17c: container
20: oil tank
22: hydraulic pressure oil
23: stock oil
24: return oil
25: stock oil held in tank body 26
26: tank body
26a: bottom
31: intake port
32: air breather
34: hydraulic pump
35: return pipe
36: pressure oil feed pipe
36a: pressure oil supply/discharge pipe
36b: pressure oil supply/discharge pipe
37: direction switching valve
37a: left changeover position
37b: neutral position
37c: right changeover position
38: intake pipe
40: air bubble 50: hydraulic cylinder
51: rod
52: cylinder tube
60: multifunction valve
61: stop valve
62: stop valve
63: stop valve
424: flow adjustment wing
425: flow adjustment wing
H1: oil level
H2: oil level

The invention claimed is:

1. An oil tank comprising:
an intake port which is provided in the vicinity of a bottom of a tank body adapted to hold oil and which is connected to a hydraulic pump adapted to supply hydraulic pressure oil to a hydraulic circuit; and
a return oil inlet which is connected to a return pipe of the hydraulic circuit and through which return oil from the hydraulic circuit is discharged to the tank body,
wherein the oil held in the tank body structures an oil surface and wherein a container adapted to hold the return oil is provided in the tank body, the container including:
a bottom formed at the bottom of the tank body;
an open end positioned above the oil surface;
the return oil inlet which opens in the vicinity of the bottom of the container, and
a flow adjustment wing arranged adjacent to the open end in a plan view, the flow adjustment wing being provided below and parallel to the oil surface.

2. The oil tank according to claim 1, wherein the flow adjustment wing includes a plurality of flow adjustment wings which are provided so as to be aligned in a direction of a depth of the container, and a lower flow adjustment wing is larger in width than an upper flow adjustment wing.

3. The oil tank according to claim 1, wherein the return pipe includes a branch pipe having a discharge port which is located above an upper operational oil level of stock oil held in the tank, and which opens onto a space corresponding to a space inside the open end of the container.

4. An oil tank comprising:
an intake port which is provided in the vicinity of a bottom of a tank body adapted to hold oil and which is connected to a hydraulic pump adapted to supply hydraulic pressure oil to a hydraulic circuit; and
a return oil inlet which is connected to a return pipe of the hydraulic circuit and through which return oil from the hydraulic circuit is discharged to the tank body,
wherein a container adapted to hold the return oil is provided in the tank body, the container including:
a bottom formed at the bottom of the tank body;
an open end positioned above an upper operational oil level of stock oil held in the tank body;
the return oil inlet which opens in the vicinity of the bottom of the container, and
a flow adjustment wing is arranged along the open end, the flow adjustment wing being provided so that a flow of stock oil having held in the container and overflowing through the open end is converted, at a position below a lower operational oil level of the stock oil held in the tank body, to a flow along a surface of the stock oil held in the tank body, and
wherein the flow adjustment wing includes a plurality of flow adjustment wings which are provided so as to be aligned in a direction of a depth of the container, and a lower flow adjustment wing is larger in width than an upper flow adjustment wing.

5. An oil tank comprising:
an intake port which is provided in the vicinity of a bottom of a tank body adapted to hold oil and which is connected to a hydraulic pump adapted to supply hydraulic pressure oil to a hydraulic circuit; and
a return oil inlet which is connected to a return pipe of the hydraulic circuit and through which return oil from the hydraulic circuit is discharged to the tank body,
wherein a container adapted to hold the return oil is provided in the tank body, the container including:
a bottom formed at the bottom of the tank body;
an open end positioned above an upper operational oil level of stock oil held in the tank body;
the return oil inlet which opens in the vicinity of the bottom of the container, and
a flow adjustment wing is arranged along the open end, the flow adjustment wing being provided so that a flow of stock oil having held in the container and overflowing through the open end is converted, at a position below a lower operational oil level of the stock oil held in the tank body, to a flow along a surface of the stock oil held in the tank body, and
wherein the return pipe includes a branch pipe having a discharge port which is located above the upper operational oil level of the stock oil held in the tank, and which opens onto a space corresponding to a space inside the open end of the container.

* * * * *